April 10, 1928.

H. FORD

BRAKE EQUALIZER

Filed Oct. 14, 1926

1,665,258

INVENTOR.
Henry Ford
BY
E. W. Davis
ATTORNEY.

Patented Apr. 10, 1928.

1,665,258

UNITED STATES PATENT OFFICE.

HENRY FORD, OF DEARBORN, MICHIGAN.

BRAKE EQUALIZER.

Application filed October 14, 1926. Serial No. 141,548.

The object of my invention is to provide a brake equalizer of simple, durable, and inexpensive construction.

A further object of my invention is to provide a brake equalizer especially adapted for use in connection with automotive vehicles having a minimum number of parts and which may be conveniently and readily installed, removed, or replaced.

Still a further object of my invention is to provide a brake equalizer whereby a single shaft may be journaled between the longitudinal frame members of an automotive vehicle and arms provided in connection with such shaft adapted to operate the brake mechanisms in connection with each of the rear wheels of the vehicle, and to provide means in connection with one of said arms whereby an impulse received thereby from a brake operating link may transmit an equalized pressure to each of the brake mechanisms for each of the rear wheels.

Figure 1:
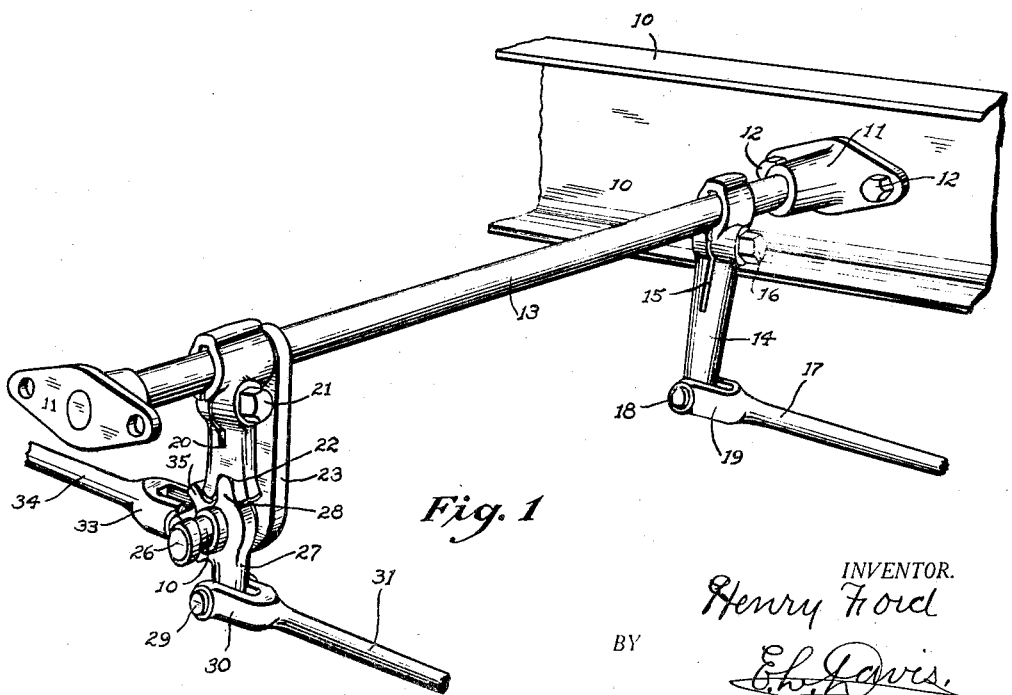

With these and other objects in view my invention consists of the arrangement, construction and combination of the various parts of my improved device as described in the specifications, claimed in the claims and illustrated in the accompanying drawing, in which Figure 1 shows a perspective view of my improved brake equalizing device, one of the frame members being removed in order to better illustrate the construction.

Figure 2:
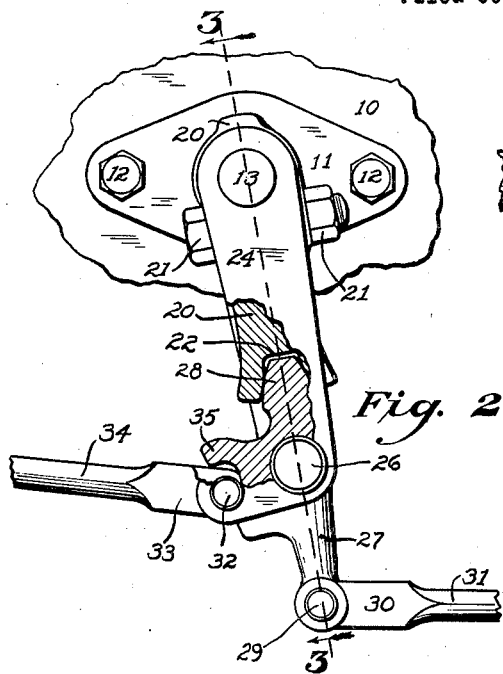
Figure 3:
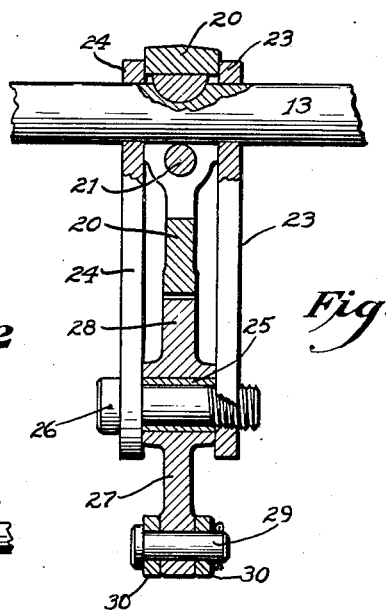

Figure 2 shows a side elevation of the improved brake mechanism, one of the frame members together with the support bracket for the shaft being removed, in order to better illustrate the construction, and Figure 3 shows a vertical, central sectional transverse view taken on the line 3—3 of Figure 2 illustrating the construction of one of the arms on the brake operating rock shaft.

Referring to the accompanying drawings, I have used the reference numeral 10 to indicate generally one of the two spaced parallel longitudinal frame members ordinarily provided in connection with an automotive vehicle, and reference numeral 11 to indicate a pair of oppositely disposed bearing brackets adapted to be secured by the screws or bolts 12, to the side frame members with the openings in said brackets aligned to each other.

A rock shaft 13, is journalled in said brackets 11, and a fixed arm 14, is secured to said shaft in any suitable manner as by having a slot 15 adjacent to the shaft receiving opening whereby a screw or bolt 16 may be tightened to draw the opposite sides of this slot 15 together to thereby clamp the arm 14 on to the shaft 13 and to hold the arm from movement relative to said shaft.

A brake operating rod or member 17 is pivotally connected to the lower end of the fixed arm 14 in any suitable manner as by a pivot pin 18 and a fork 19 formed in the end of the brake operating rod 17. This brake operating rod 17 is designed to be extended to position adjacent to the right rear wheel of the vehicle and to operate the brake mechanism thereon in any of the well known ways in which such mechanisms are operated. It will be understood that such mechanisms are ordinarily operated by reciprocation of brake rod or member 17.

Adjacent to the opposite end of the shaft 13 from that at which the fixed arm 17 is mounted, is a composite brake operating arm which will now be described. One member thereof consists of a fixed arm 20 of approximately half the length of the fixed arm 14 which is secured to the rock shaft 13 and held from movement relative thereto in any suitable manner. In the form of device here illustrated the fixed arm 20 is slotted and a screw or bolt 21 is used to draw the opposite sides of the slot together thereby clamping the arm to the rock shaft 13. The lower end of this fixed arm 20 is formed with a notch 22 therein, in the middle thereof, whereby what might be called two gear teeth and the adjacent notch therebetween are formed at the lower end of this fixed arm 20.

At either side of the fixed arm 20 a pair of arms of greater length than the arm 20 are pivotally mounted on the rock shaft 13, these pivoted arms being designated by the numerals 23 and 24 respectively. The members 23 and 24 together form what may be hereafter designated as a pivoted arm mounted on the rock shaft 13. The lower ends of the members 23 and 24 have a combined bearing and spacing sleeve 25 extended therebetween, and a bolt 26, or other suitable device for the purpose, extends through the ends of the members 23 and 24, and the sleeve 25 to thereby hold those three members rigid relative to each other and to form the pivoted arm which may hereinafter be mentioned.

Pivotally mounted on the sleeve 25 between the members 23 and 24 and below the fixed arm 20 is a rocking lever 27 comprising a lower arm and an upper arm which terminates in a tooth 28 designed to co-act with the notch 22 in the fixed arm 20 to thereby form what may be termed a gear connection between the fixed arm 20 and the rocking lever 27.

The lower end of the rocking lever 27 is pivotally connected to the brake operating rod or members 31 by any suitable mechanism as, by a pivot pin 29, adapted to pass through the lever 27 and the forked end 30 of the forward end of the brake operating rod or member 31. This brake operating rod is designed to operate the brake mechanism on the left hand rear wheel of the vehicle in the same manner that the brake rod or member 17 is designed to operate the mechanism for the right hand rear wheel.

The pivoted arm comprising the members 23 and 24 has a forwardly extending portion or lug designed to receive a pin 32 which serves to secure the members 23 and 24 together and as a pivot for a link 34 which is adapted to be connected with the usual foot pedal or emergency brake lever provided in connection with an automotive vehicle to reciprocate brake links. The link 34 is provided with a fork 33 which forms a pivot connection between the link 34 and the pivoted arm 27 by means of the pivot pin 32. The rocking lever 27 has a lug 35 extending forwardly therefrom to position above the pin 32 in the normal position of the parts, whereby this lug 35 may serve as a stop to insure emergency operation of at least one rear wheel brake in case portions of this device become injured in some way.

In the practical operation of my improved brake equalizing member, the parts are assembled to the position shown in Figure 1 of the drawing, it being understood, however, that the member 24 of the pivoted arm has been removed in that view, to better illustrate the construction. If, when the parts are in this position, the brake link 34 is moved forwardly it will be seen that this will drag the pivoted arm forward also by means of the pin 32. This forward movement of the pivoted arm will carry the bolt 26 forward and tend to move the rocking lever 27 forward. Forward movement of the lower end of the rocking lever 27 will tend to carry the brake rod 31 forward to thereby operate the left hand rear wheel brake of the vehicle. The resistance of this brake mechanism will then tend to swing the rocking lever 27 on the pivot 26 which will tend to swing the lower end of the fixed arm 20 forwardly due to the gear type connection between the rocking lever 27 and the fixed arm 20. As arm 20 causes the shaft 13 to move therewith, forward movement of the fixed arm 20 will impart a corresponding forward movement to fixed arm 14 thereby imparting a forward movement to the brake operating rod 17 thereby operating the brake for the right hand rear wheel.

The length of the ends of the rocking lever 27, and the lengths of the fixed arms 20 and 14, are, of course, so proportioned that the pull applied to both the brake operating rods will be the same but that longitudinal movement of either brake rod relative to the other which may be necessary due to inequality of the brake action will be permitted. If for any reason either of the rear wheel brakes or the brake operating rods fail to function then the stop 35 on the rock lever 27 engages the pin 32 to prevent further swinging of the rock arm or further equalization of the brakes and causes a positive pull to be imparted to the brake rod which is still functioning.

Among the many advantages arising from my improved brake equalizing device, it should first be pointed out that the parts differ from an ordinary un-equalized brake operating mechanism only in the use of the composite pivoted arm which, however, is of relatively simple and inexpensive construction. The parts are simple and not likely to get out of order and may be readily repaired or replaced if it should ever be necessary. Moreover, simple means are provided whereby the equalizing action is positively limited so that one brake may always be operated even though the other has been damaged and is out of order.

It will be understood that I have herein illustrated merely one form or application of my improved equalizing device and that it may be applied with equal advantage to front wheel brakes or to the connections between front and rear wheel brakes and that some changes may be made in the construction and arrangement without departing from the spirit of my invention so that it is my intention to cover by my claims such changes as reasonably may be included within the scope thereof.

I claim as my invention:

1. In an equalizing device, a frame, a rock shaft journalled thereon, a pair of operating members mounted on said frame, a pair of arms fixed to said rock shaft means for operatively connecting one of said operating members to one of said arms, an operated member, an arm pivotally mounted on said shaft, means for operatively connecting said operated member with the pivoted arm, a second arm pivotally mounted on said first pivoted arm, and means for operatively connecting the second pivoted arm with the second fixed arm and the second operating member whereby pressure from the operated member may be transmitted substantially equally to the operating members and said members may be moved unequal distances by said pressure.

2. In an equalizing device, a frame, a rock shaft journalled thereon, a pair of operating members mounted on said frame, a pair of arms fixed to said rock shaft, means for operatively connecting one of said operating members to one of said arms, an operated member, an arm pivotally mounted on said shaft, means for operatively connecting said operated member with the pivoted arm, a second arm pivotally mounted on said first pivoted arm, and means for operatively connecting the second pivoted arm with the second fixed arm and the second operating member whereby pressure from the operated member may be transmitted substantially equally to the operating members and said members may be moved unequal distances by said pressure, said means being adapted to limit the movement of said members relative to each other.

3. In an equalizing device, a frame, a rock shaft journalled thereon, a pair of operating members mounted on said frame, a pair of arms fixed to said rock shaft, means for operatively connecting one of said operating members to one of said arms, an operated member, an arm pivotally mounted on said shaft, means for operatively connecting said operated member with the pivoted arm, a second arm pivotally mounted on said first pivoted arm, means for operatively connecting the second pivoted arm with the second operating member, and a gear connection between the second pivoted arm and the second fixed arm whereby actuation of the operated member may exert an equalized pressure on the operating members.

4. In an equalizing device, a frame, a rock shaft journalled thereon, a pair of operating members mounted on said frame, a pair of arms fixed to said rock shaft, means for operatively connecting one of said operating members to one of said arms, an operated member, an arm pivotally mounted on said shaft, means for operatively connecting said operated member with the pivoted arm, a second arm pivotally mounted on said first pivoted arm, means for operatively connecting the second pivoted arm with the second operating member, and a gear connection with a stop therefor between the second pivoted arm and the second fixed arm whereby actuation of the operating member may exert a limited equalized pressure on the operating members.

5. In a brake equalizing device, a vehicle frame, a rock shaft thereon, a pair of brake operating rods, a pair of arms fixed to the rock shaft, means for pivoting one of said rods to one of said arms, an arm pivoted to said shaft, a second arm pivoted to the first pivoted arm, and means for operatively connecting the second pivoted arm with the second brake rod and the second fixed arm to cause swinging of the pivoted arm to impart equalized longitudinal movement to both brake rods.

6. In a brake equalizing device, a vehicle frame, a rock shaft, thereon, a pair of brake operating rods, a pair of arms fixed to the rock shaft, means for pivoting one of said rods to one of said arms, an arm pivoted to said shaft, a second arm pivoted to the first pivoted arm, and means for operatively connecting the second pivoted arm with the second brake rod and the second fixed arm to cause swinging of the pivoted arm to impart limited equalized longitudinal movement to both brake rods.

7. In a brake equalizing device, a vehicle frame, a rock shaft thereon, a pair of brake operating rods, an arm fixed to the rock shaft, means for pivoting said arm to one of said brake rods, a second arm fixed to the shaft having teeth formed thereon, an arm pivoted on said shaft, a second arm pivoted on the first pivoted arm and having teeth thereon adapted to mesh with the teeth on the second fixed arm, and means for pivoting the second brake rod to the second pivoted arm whereby swinging of the pivoted arm may impart equalized longitudinal movement to said brake rods.

8. In a brake equalizing device, a vehicle frame, a rock shaft thereon, a pair of brake operating rods, an arm fixed to the rock shaft, means for pivoting said arm to one of said brake rods, a second arm fixed to the shaft having teeth formed thereon, an arm pivoted on said shaft, a second arm pivoted on the first pivoted arm and having teeth thereon adapted to mesh with the teeth on the second fixed arm, said teeth being adapted to limit the gear action between the second fixed arm and the second pivoted arm, and means for pivoting the second brake rod to the second pivoted arm whereby swinging of the pivoted arm may impart limited equalized longitudinal movement to said brake rods.

9. In an equalizing device, a rock shaft, an arm pivoted concentrically therewith, an arm pivoted to said pivoted arm, an arm fixed to the shaft, and means for operatively connecting the second pivoted arm and the fixed arm to equalize the movement imparted to the shaft and the second pivoted arm by the first pivoted arm.

10. In an equalizing device, a rock shaft, an arm pivoted concentrically therewith, an arm pivoted to said pivoted arm, an arm fixed to the shaft, and means for operatively connecting the second pivoted arm and the fixed arm to equalize the movement imparted to the shaft and the second pivoted arm by the first pivoted arm, said means being adapted to limit the equalizing.

11. In a brake equalizing device, a rock shaft, an arm fixed thereto, an arm pivoted thereon, a second arm pivoted to the first pivoted arm, said second pivoted arm and the fixed arm having a gear connection and operating members operatively connected with the shaft and second pivoted arm whereby equalized movements may be permitted between the operating members.

12. In a brake equalizing device, a rock shaft, an arm fixed thereto, an arm pivoted thereon, a second arm pivoted to the first pivoted arm, said second pivoted arm and the fixed arm having a gear connection adapted to permit limited gear action, and operating members operatively connected with the shaft and second pivoted arm whereby limited equalized movement may be permitted between the operating members.

HENRY FORD.